Sept. 26, 1950      J. H. REITZ      2,523,448
JACK TYPE TIRE BEAD AND RIM SEPARATING DEVICE
Filed Jan. 2, 1948
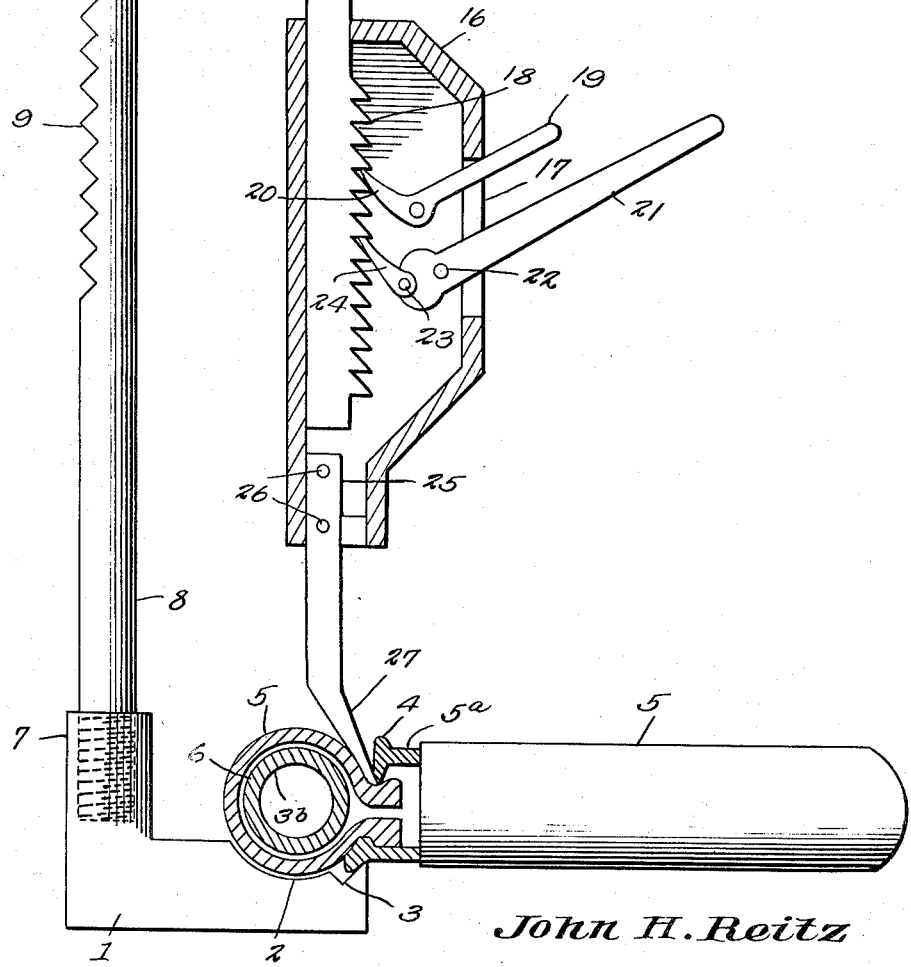

Patented Sept. 26, 1950

2,523,448

UNITED STATES PATENT OFFICE 2,523,448

JACK TYPE TIRE BEAD AND RIM SEPARATING DEVICE

John H. Reitz, Johnstown, Pa.

Application January 2, 1948, Serial No. 269

4 Claims. (Cl. 157—1.26)

This invention relates to improvements in devices for removing tires from rims of automobile wheels, and more particularly to the provision of a device for depressing the bead of a tire while on a rim.

The removal of a tire from a wheel rim is usually an inconvenient and exasperating operation. The usual hand tools require skill and strength, and patience. Many times it is necessary that a tire be removed by a person not skilled in such procedure.

It is therefore an object of this invention to provide a device by means of which a tire can be easily and with little effort quickly removed from the rim of a wheel by unskilled as well as skilled persons.

A further object is to provide a tire remover having the characteristics of a jack which can be quickly assembled and disassembled to enable it to be compactly stored when not in use.

These and other objects are attained by the novel construction and arrangement of parts hereinafter disclosed and illustrated by the accompanying drawings, forming a part hereof, and in which:

Fig. 1 is a plan view of a portion of a tire remover embodying the invention.

Fig. 2 is a side elevational view of the tire remover.

Referring to the drawings, the tire remover is shown to comprise a base 1 having a substantially semi-circular depression 2 adapted to receive a tire casing 5. The base 1 is also provided with a V-shaped groove 3 arranged to receive the bead 4 of a tire rim 5a. An inner tube 6 is in the casing 5. The base 1 has an upstanding portion 7 with an internally threaded socket receiving the threaded lower end of a staff 8, which is provided with a plurality of notches 9.

Slidable over the staff 8 is a collar 11, which is held in adjusted positions by means of a set screw 12 engaging the staff 8 at one of the notches 9. Fixed to the collar 11 is a bar 10 over which slides a collar 13 held in adjusted positions by a set screw 14. The collar 13 is fixed to a vertical bar 15 having teeth 18 on one side thereof and slidable through a casing 16 having a slot 17 through which pass handles 19 and 21. The handle 19 is pivotally connected to the casing 16 and has one end formed into a dog 20 to engage the teeth 18 to hold the bar 15 in a definite position. Counterclockwise rotation of the handle 19 is limited by the engagement of the handle 19 with the casing 16 at the upper end of the slot 17.

Handle 21 is pivotally connected to the casing 16 and 22, and at 23 has pivotally connected thereto a dog 24 which engages the teeth 18 and normally tends to rotate counterclockwise by gravity or spring pressure.

A bar 25 is secured to the lower end of the casing 16 by means of rivets 26, screws or similar means. The lower end of the bar 25 is bent to provide a tapered blade 27 adapted to be forced between the rim bead 4 and the tire bead.

In operation, the handle 21 is moved down to move the casing 16 down, the teeth 18 and pawl 24 acting as a fulcrum. The downward movement of the casing carries with it the bar 25, and presses the blade 27 between the rim bead and tire, depressing the tire bead so that the tire can be easily removed from the rim.

It will be seen that by loosening the set screws 12 and 14 the device can be quickly disassembled so that it can be compactly stored when not in use. The device is simple in structure and easy to manipulate, requiring no skill or previous experience. The jacking procedure requires very little effort.

When it is desired to remove the bar 15 from the casing 16, the handle 21 is depressed sufficiently to enable the dog 20 to be disengaged from the teeth 18 and rotated to an out of the way position by moving the handle 19 down. When the bar 15 is moved upward, the teeth 18 ratchet over the dog 20 and the pawl 24. In installing the bar 15, both handles 19 and 21 are depressed to out of the way positions, there being a connection between dog 20 and pawl 24 so that when dog 20 moves clockwise it will move pawl 24 clockwise and out of engagement with the teeth 18.

It will be seen that there has been provided a simple and effective jacking device for removing tires from rims. The device is rugged and has few parts to get out of order.

The above description is to be considered as illustrative and not limitative of the invention of which modifications can be made without departing from the spirit and scope of the appended claims.

The invention having been described, what is claimed is:

1. In a tire removing device, a base, a notched staff removably attached to the base, a cross bar, means to hold the bar in adjusted positions on the staff, a vertical bar, means to hold the vertical bar in adjusted positions on the cross bar, said vertical bar having a plurality of ratchet teeth, a casing through which the vertical bar passes, said casing having a vertical slot, a pair of levers pivotally connected to the casing and passing through the slot and having means to engage the ratchet teeth, and a bar attached to the lower end of the casing and having its lower end bent to form a tapered blade.

2. The structure set forth in claim 1 further characterized by said cross bar having a collar encircling the staff and also having a set screw passing through the collar to engage the notches on the staff to hold the collar in adjusted positions on the staff.

3. The structure set forth in claim 1 further characterized by the vertical bar having a collar encircling the cross bar, and a set screw passing through the collar to hold the collar in adjusted positions on the cross bar.

4. The structure set forth in claim 1 further characterized by one of said levers having a dog engageable with the teeth to hold the casing and vertical bar in a definite position relative to each other, and the other lever having a pivoted pawl engageable with the teeth to move the casing relative to the vertical bar.

JOHN H. REITZ.

REFERENCES CITED

The following references are of record in the file of this patent:

UNITED STATES PATENTS

| Number | Name | Date |
|---|---|---|
| 470,116 | Finsterer | Mar. 1, 1892 |
| 1,137,555 | Turnbull | Apr. 27, 1915 |
| 1,495,884 | Chapman | May 27, 1924 |
| 1,646,511 | Weaver et al. | Oct. 25, 1927 |
| 1,783,827 | Carr | Dec. 2, 1930 |